W. A. RANDLE.
AUTOMOBILE AND ENGINE LOCK ATTACHMENT.
APPLICATION FILED MAY 22, 1919.
1,317,315.  Patented Sept. 30, 1919.
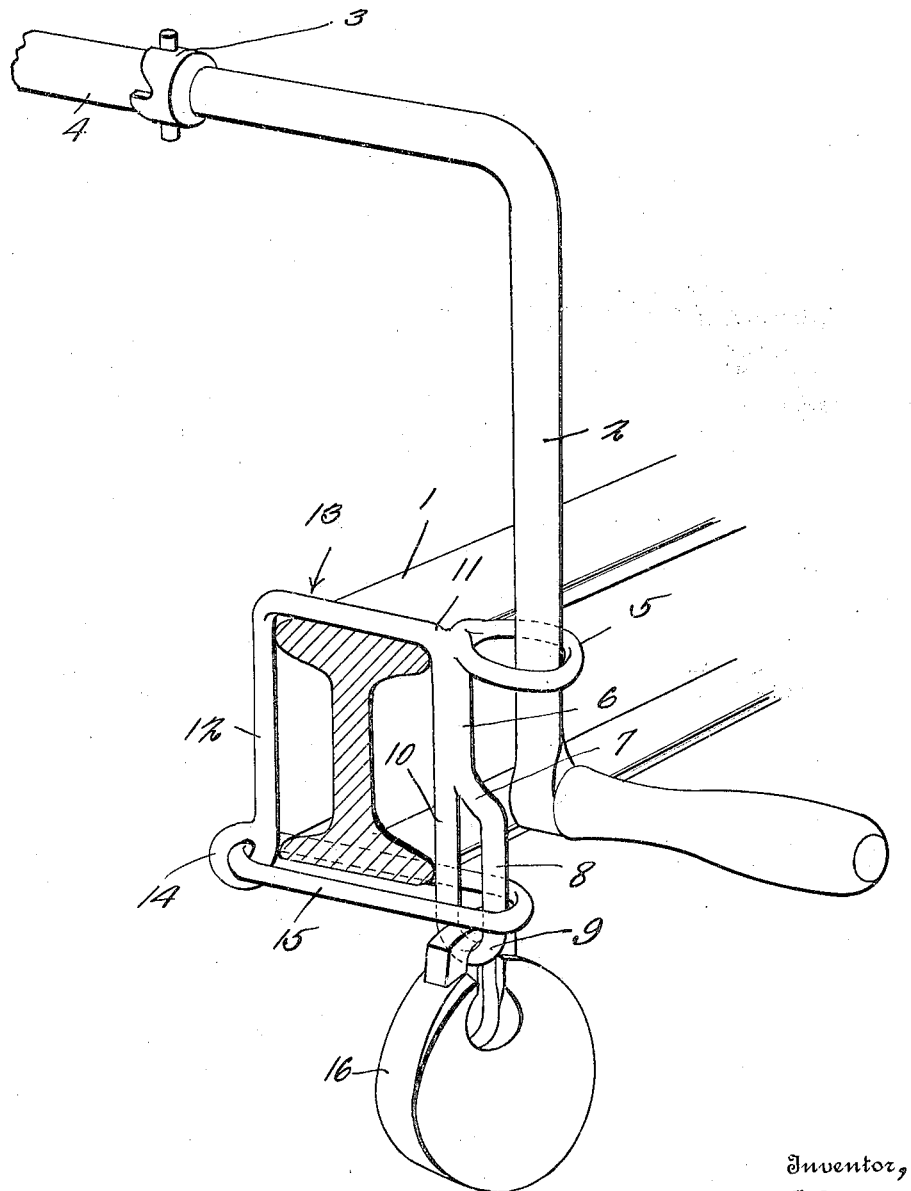
Inventor,
W. A. Randle
By C. A. Snow & Co.
Attorneys.
Witness

UNITED STATES PATENT OFFICE.

WILLIAM A. RANDLE, OF WEATHERFORD, OKLAHOMA.

AUTOMOBILE AND ENGINE LOCK ATTACHMENT.

1,317,315.  Specification of Letters Patent.  Patented Sept. 30, 1919.

Application filed May 22, 1919. Serial No. 298,926.

*To all whom it may concern:*

Be it known that I, WILLIAM A. RANDLE, a citizen of the United States, residing at Weatherford, in the county of Custer and State of Oklahoma, have invented a new and useful Automobile and Engine Lock Attachment, of which the following is a specification.

This invention relates to automobile engine locking devices and has for its object the provision of an attachment that will effectively lock the engine of a motor vehicle to prevent theft or the unauthorized use of the vehicle.

Another object is to produce a device that is simple, easily manufactured, that has but few parts, that is comparatively light in weight, and that will positively lock the crank of the engine to the frame of the car with the crank in engagement with the engine shaft and thus prevent rotation of the engine.

With these and other objects in view as will appear as the description proceeds, and as particularly pointed out in the appended claims, it is within the province of the disclosure to improve generally and to enhance the utility of devices of that type to which the present invention appertains.

In the drawing the device is shown in perspective as applied to the starting crank of an automobile engine to lock the same.

Referring to the drawing by characters of reference, the numeral 1 designates the front axle of an automobile, 2 the starting crank, 3 the clutch carried by the crank for engaging the engine shaft indicated at 4. The locking device consists of a two part member, formed to engage the starting crank and front axle of the vehicle to lock the starting crank clutch in engagement with the engine shaft. In the present showing each part is formed from a single piece of metal, but it is to be understood that other methods of manufacture may be resorted to.

The first part of the locking device consists of a ring 5 having its axial alinement approximately parallel to a downwardly extending portion 6. At 7 the device is bent outwardly and at 8 is again bent downwardly. A loop 9 is formed for a purpose to presently appear and the rear leg 10 of the loop extends upwardly and parallel with the portion 6 with which it is integrally formed. At a point 11 adjacent the ring 5 and arm is made at right-angles to the portion 6 and away from the ring 5, and then bent downwardly and parallel with the leg 10, as shown at 12, to a point opposite the loop 9 to form an axle engaging member 13. An eye 14 is formed at the lower end of the portion 12 and carries a link 15, said link constituting the second part of the device and being freely movable in the eye 14 and of such length as to reach the loop 9 and pass over it.

In attaching the device to an automobile to lock the same the engine shaft must first be placed in a position in which, with the clutch 3 engaging the engine shaft 4 the crank will be in a downwardly extending position. The eye 5 is then placed over the handle and moved along the same and up the crank arm 2 with the loop 9 extending downwardly. The axle engaging member 13 is then placed over the axle 1 and the link 15 swung under the axle and over the loop 9. The shackle of an ordinary pad lock 16 is then passed through the loop 9 under the link 15 to secure the device to the axle. With the crank locked in this way and its clutch in engagement with the engine shaft it will be impossible to start the engine by means of the crank, by the starter, should the car be equipped with one, or by letting the car drift and then throwing the gear in mesh.

The locking device herein described is simple in construction, may be used with any automobile having a starting crank and any form of shackle lock may be used therewith.

Although the preferred embodiment of the invention has been shown and described it is to be understood that many changes may be made within the scope of the claims without departing from the spirit or sacrificing any of the advantages of the invention.

Having thus described the invention, what is claimed is:—

1. In an automobile locking device, a ring for engaging the starting crank, a U-shaped member to which the ring is attached, said member adapted to engage a part of the vehicle frame, a loop formed on one leg of the U-shaped member and a link movably secured to the other leg of the U-shaped member and engaging the loop on the first mentioned leg.

2. In a device of the class described a U- shaped axle engaging member, one leg of which comprises a lock retaining loop and a crank engaging ring, the other leg being provided with a movable member for closing the open end of the U member.

In testimony that I claim the foregoing as my own, I have hereto affixed my signature in the presence of two witnesses.

WILLIAM A. RANDLE.

Witnesses:
L. L. SHAW,
J. E. RILEY.